United States Patent
Niiyama et al.

(10) Patent No.: US 6,958,595 B2
(45) Date of Patent: Oct. 25, 2005

(54) STEP-UP/STEP-DOWN DC-DC CONVERTER AND PORTABLE DEVICE EMPLOYING IT

(75) Inventors: Kenichi Niiyama, Kyoto (JP); Michiaki Yama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/885,120

(22) Filed: Jul. 7, 2004

(65) Prior Publication Data
US 2005/0007089 A1 Jan. 13, 2005

(30) Foreign Application Priority Data
Jul. 8, 2003 (JP) .............................. 2003-193354

(51) Int. Cl.[7] .............................................. G05F 1/40
(52) U.S. Cl. ..................................................... 323/282
(58) Field of Search ............................... 323/282, 283, 323/284, 285, 288, 351

(56) References Cited

U.S. PATENT DOCUMENTS

| | | | | |
|---|---|---|---|---|
| 5,831,418 A | * | 11/1998 | Kitagawa | .................... 323/222 |
| 6,448,752 B1 | * | 9/2002 | Umemoto | .................. 323/288 |
| 6,489,756 B2 | * | 12/2002 | Kanouda et al. | ............. 323/284 |
| 6,791,306 B2 | * | 9/2004 | Walters et al. | ............... 323/288 |
| 6,815,938 B2 | * | 11/2004 | Horimoto | .................... 323/282 |

FOREIGN PATENT DOCUMENTS

JP    2002-262548    9/2002

* cited by examiner

Primary Examiner—Adolf Berhane
(74) Attorney, Agent, or Firm—Arent Fox PLLC

(57) ABSTRACT

In a step-up/step-down DC-DC converter, an error signal commensurate with a difference between a voltage commensurate with the output voltage and a predetermined reference voltage and a triangular wave signal are compared by a first comparator, whose output is used to turn on and off a step-up switching circuit. An inverted signal obtained by inverting the error signal and the triangular wave signal are compared by a second comparator, whose output is used to turn on and off a step-down switching circuit. The median level between the outputs of the first and second comparators is set to be lower than the maximum level of the triangular wave signal and higher than the minimum level thereof. Thus, when step-up and step-down modes are switched from one to the other, an overlap period is produced during which the step-up and step-down modes overlap. This makes possible smooth switching between the step-up and step-down modes.

8 Claims, 5 Drawing Sheets

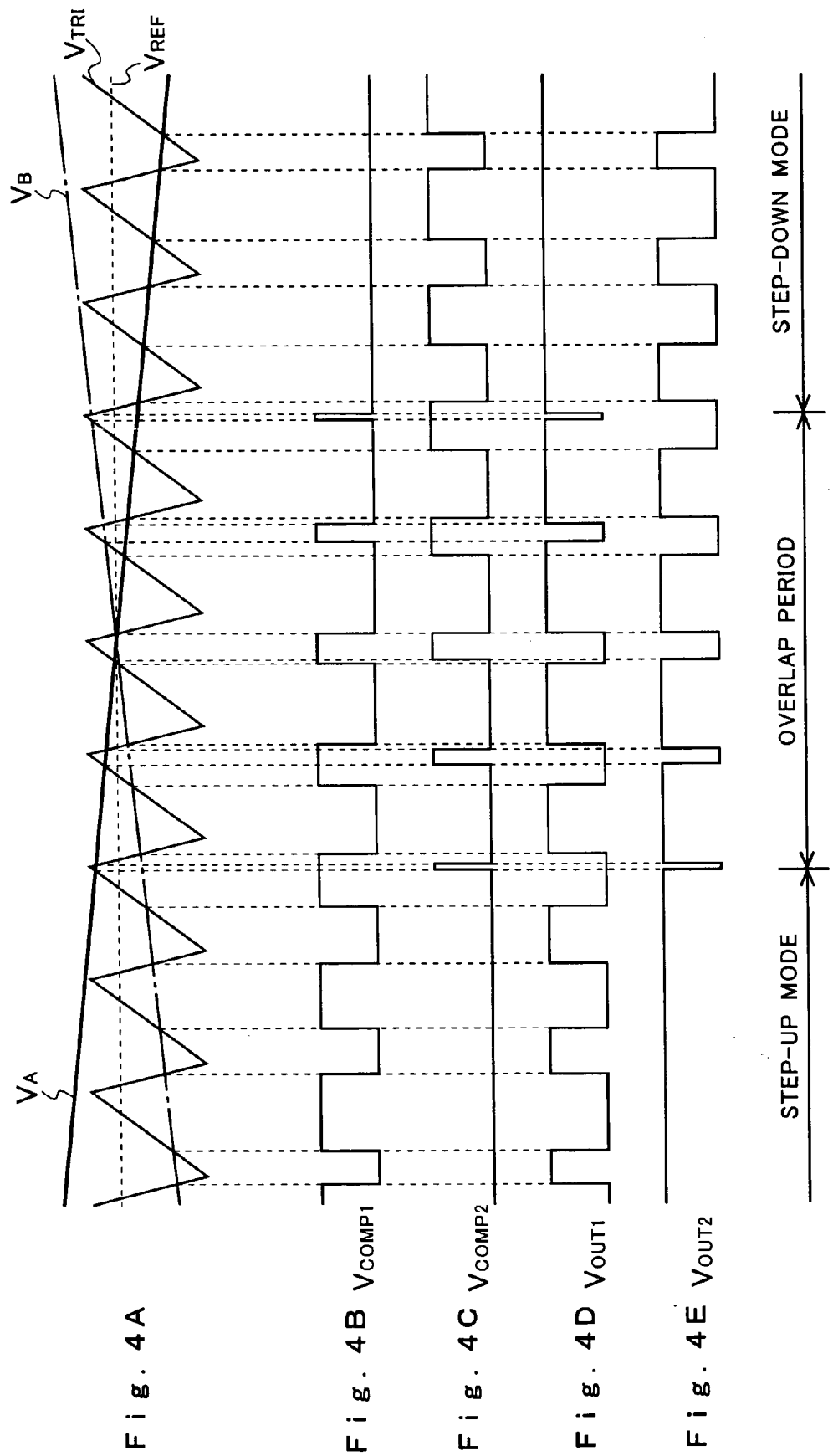

US 6,958,595 B2

STEP-UP/STEP-DOWN DC-DC CONVERTER AND PORTABLE DEVICE EMPLOYING IT

This application is based on Japanese Patent Application No. 2003-193354 filed on Jul. 8, 2003, the contents of which are hereby incorporated by reference.

BACKGROUND OF THE INVENTION

1. Field of the Invention

The present invention relates to a step-up/step-down DC-DC converter that steps up or down the voltage inputted thereto and outputs the resulting voltage.

2. Description of the Prior Art

An example of the configuration of a conventional step-up/step-down DC-DC converter is shown in FIG. 6. The conventional step-up/step-down DC-DC converter shown in FIG. 6 is composed of an input voltage monitoring circuit 24 and a step-up/step-down mode switchable DC-DC converter 25. A direct-current source 23 is connected to the input voltage monitoring circuit 24 and to the step-up/step-down mode switchable DC-DC converter 25, so that the output voltage of the direct-current source 23 is used as an input voltage $V_{IN}$ to the conventional step-up/step-down DC-DC converter.

The input voltage monitoring circuit 24 compares the input voltage $V_{IN}$ with a target voltage. If the input voltage $V_{IN}$ is lower than the target voltage, the input voltage monitoring circuit 24 feeds the step-up/step-down mode switchable DC-DC converter 25 with a control signal to request it to switch to a step-up mode. If the input voltage $V_{IN}$ is higher than the target voltage, the input voltage monitoring circuit 24 feeds the step-up/step-down mode switchable DC-DC converter 25 with a control signal to request it to switch to a step-down mode.

Thus, according to the control signal fed from the input voltage monitoring circuit 24, the step-up/step-down mode switchable DC-DC converter 25 chooses between the step-up and step-down modes so as to yield an output voltage equal to the target voltage by stepping up or down the input voltage $V_{IN}$.

However, in the step-up/step-down DC-DC converter shown in FIG. 6, the internal impedance of the direct-current source 23 and the load current have a relationship such that, around the threshold between the step-up and step-down modes, the input voltage $V_{IN}$ fluctuates, for example, by about 1 kHz. This fluctuation of the input voltage $V_{IN}$ produces a ripple in the output voltage $V_{OUT}$, and thereby degrades the power conversion efficiency of the step-up/step-down DC-DC converter. In particular, in a case where a battery is used as the direct-current source and the step-up/step-down DC-DC converter is used in a portable device, the above phenomenon inconveniently shortens the life of the battery. Incidentally, when the ripple superimposed on the output voltage $V_{OUT}$ is of the order of 0.1 V, the degradation of the power conversion efficiency is no longer negligible.

Japanese Patent Application Laid-Open No. 2002-262548 discloses, in FIG. 9, a DC-DC converter that smoothly switches between step-up and step-down modes. However, in the DC-DC converter shown in FIG. 9 of Japanese Patent Application Laid-Open No. 2002-262548, the overlap period during which the step-up and step-down modes overlap becomes longer in the following cases: when the bottom of the triangular wave Vt becomes lower; when the top of the triangular wave Vt becomes higher; when the potential difference between the voltages Ve1 and Ve2, both the output voltages of a monitoring circuit, becomes smaller; and when the voltage Ve1, one of the output voltages of the monitoring circuit, is detected to be lower. This makes it necessary to manage the following four items: the bottom of the triangular voltage Vt, the top of the triangular voltage Vt, the potential difference between the voltages Ve1 and Ve2, and the voltage Ve1. Thus, it is not easy to enhance the accuracy of the overlap period.

SUMMARY OF THE INVENTION

An object of the present invention is to provide a step-up/step-down DC-DC converter that always yields a stable output voltage regardless of the condition of the input voltage, and to provide a portable device employing such a step-up/step-down DC-DC converter.

To achieve the above object, according to one aspect of the present invention, a step-up/step-down DC-DC converter that yields an output voltage by stepping up or down an input voltage is provided with: an error signal generation circuit that generates an error signal commensurate with the difference between a voltage commensurate with the output voltage and a predetermined reference voltage; an inverting circuit that generates an inverted signal by inverting the error signal with respect to a predetermined inversion reference voltage; a triangular wave generation circuit that generates a triangular wave signal whose maximum level is higher than the predetermined inversion reference voltage and whose minimum level is lower than the predetermined inversion reference voltage; a first comparator that compares the error signal with the triangular wave signal; a second comparator that compares the inverted signal with the triangular wave signal; a step-up switching circuit that is turned on and off according to the output of the first comparator; a step-down switching circuit that is turned on and off according to the output of the second comparator; an inductor to and from which energy is accumulated and released as the step-up switching circuit and/or the step-down switching circuit is turned on and off; and a smoothing circuit that smoothes the output voltage by receiving the energy released from the inductor.

Since the predetermined inversion reference voltage is set to be lower than the maximum level of the triangular wave signal and higher than the minimum level thereof, when a step-up mode for performing step-up operation and a step-down mode for performing step-down operation are switched from one to the other, an overlap period is produced during which the step-up and step-down modes overlap. This overlap period permits smooth switching between the step-up and step-down modes. Thus, even when the input voltage fluctuates, it is possible to reduce the ripple superimposed on the output voltage. This makes it possible to always yield a stable output voltage, and thereby to obtain increased power conversion efficiency.

Moreover, with this configuration, when the top of the triangular wave signal becomes higher, or when the reference voltage becomes lower, the overlap period during which the step-up and step-down modes overlap becomes longer. Accordingly, it is necessary to manage only two items, namely the top of the triangular wave signal and the reference voltage. Thus, it is possible to make the accuracy of the overlap period higher than with the DC-DC converter disclosed in Japanese Patent Application Laid-Open No. 2002-262548 mentioned above.

According to another aspect of the present invention, a semiconductor integrated circuit device for a step-up/step-down DC-DC converter is provided with: an output terminal; an error signal generation circuit that generates an error signal commensurate with the difference between a voltage commensurate with the voltage at the output terminal and a predetermined reference voltage; an inverting circuit that generates an inverted signal by inverting the error signal with respect to a predetermined inversion reference voltage; a triangular wave generation circuit that generates a triangular wave signal whose maximum level is higher than the predetermined inversion reference voltage and whose minimum level is lower than the predetermined inversion reference voltage; a first comparator that compares the error signal with the triangular wave signal; a second comparator that compares the inverted signal with the triangular wave signal; a step-up switching circuit that is turned on and off according to the output of the first comparator; and a step-down switching circuit that is turned on and off according to the output of the second comparator.

By externally fitting and connecting an inductor and a capacitor to the semiconductor integrated circuit device for a step-up/step-down DC-DC converter configured as described above, it is possible to realize the step-up/step-down DC-DC converter configured as described previously.

In the step-up/step-down DC-DC converter configured as described previously or in the semiconductor integrated circuit device for a step-up/step-down DC-DC converter configured as described above, a filter circuit for reducing the noise that accompanies the triangular wave signal may be provided between the input and output sides of the error signal generation circuit.

According to still another aspect of the present invention, a portable device is provided with a step-up/step-down DC-DC converter configured as described previously.

The step-up/step-down DC-DC converter configured as described previously always yields a stable output voltage, and offers high power conversion efficiency. Thus, even when operated from a battery, it helps prolong the life of the battery, and permits the portable device to be used for an extended period.

The portable device configured as described above may be further provided with a regulator, a DC-DC converter, and a circuit whose driving requires a large current and makes the voltage supplied thereto fluctuate greatly. Here, the output voltage of the step-up/step-down DC-DC converter is fed through the regulator and the DC-DC converter to the circuit whose driving requires a large current and makes the voltage supplied thereto fluctuate greatly.

With this configuration, the output of the step-up/step-down DC-DC converter configured as described previously is not directly fed to the circuit whose driving requires a large current and makes the voltage supplied thereto fluctuate greatly. This helps stabilize the load current of the step-up/step-down DC-DC converter configured as described previously, and thus helps further stabilize the output voltage of the step-up/step-down DC-DC converter configured as described previously.

BRIEF DESCRIPTION OF THE DRAWINGS

This and other objects and features of the present invention will become clear from the following description, taken in conjunction with the preferred embodiments with reference to the accompanying drawings in which:

FIGS. 4A to 4E are diagrams showing the waveforms of the voltages at relevant points as observed during switching from the step-up mode to the step-down mode;

DESCRIPTION OF THE PREFERRED EMBODIMENTS

Figure 1:
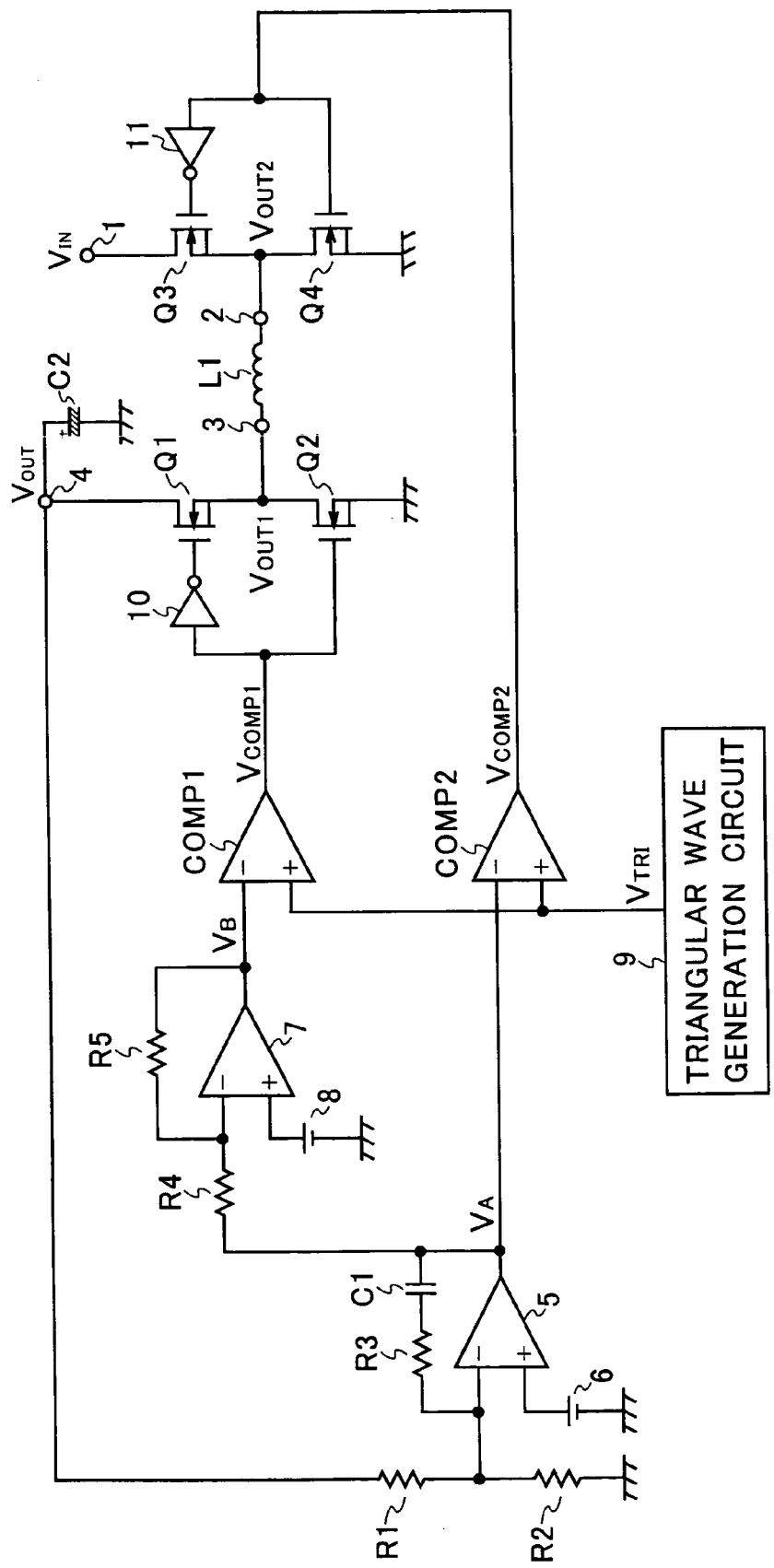
FIG. 1 is a diagram showing an example of the configuration of a step-up/step-down DC-DC converter according to the invention.

FIG. 1 shows an example of the configuration of a step-up/step-down DC-DC converter according to the present invention. The step-up/step-down DC-DC converter shown in FIG. 1 receives, as an input voltage $V_{IN}$ thereto, the output voltage of a direct-current power source (not illustrated) such as a battery. The input voltage $V_{IN}$ is applied to an input terminal 1, which is connected to the drain of an n-channel MOS field-effect transistor (hereinafter referred to as an nMOS transistor) Q3. The source of the nMOS transistor Q3 is connected to a terminal 2 and to the drain of an nMOS transistor Q4. The source of the nMOS transistor Q4 is grounded.

The terminal 2 is connected through a coil L1 to a terminal 3. The terminal 3 is connected to the source of an nMOS transistor Q1 and to the drain of an nMOS transistor Q2. The drain of the nMOS transistor Q1 is connected to an output terminal 4, and the source of the nMOS transistor Q2 is grounded.

The output terminal 4 is connected to one end of a resistor R1 and to an output capacitor C2. The other end of the resistor R1 is grounded through a resistor R2.

The node between the resistors R1 and R2 is connected to an inverting input terminal of an error amplifier 5. A reference voltage source 6 is connected to the non-inverting input terminal of the error amplifier 5. The output terminal of the error amplifier 5 is connected through a capacitor C1 and a resistor R3 to the inverting input terminal of the error amplifier 5.

The output terminal of the error amplifier 5 is connected to the input end of an inverting amplifier, which is composed of resistors R4 and R5, a comparator 7, and a reference voltage source 8. The output terminal of the error amplifier 5 is also connected directly to the inverting input terminal of a comparator COMP2. One end of the resistor R4 serves as the input end of the inverting amplifier, and the other end of the resistor R4 is connected to the inverting input terminal of the comparator 7 and to one end of the resistor R5. The reference voltage source 8 is connected to the non-inverting input terminal of the comparator 7. The node between the other end of the resistor R5 and the output terminal of the comparator 7 serves as the output end of the inverting amplifier. The output end of the inverting amplifier is connected to the inverting input terminal of a comparator COMP1.

A triangular wave generation circuit 9 is connected to the non-inverting input terminal of the comparator COMP1 and to the non-inverting input terminal of the comparator COMP2. The output terminal of the comparator COMP1 is connected through an inverter circuit 10 to the gate of the nMOS transistor Q1, and is connected directly to the gate of the nMOS transistor Q2. The output terminal of the comparator COMP2 is connected through an inverter circuit 11 to the gate of the nMOS transistor Q3, and is connected directly to the gate of the nMOS transistor Q4.

From the viewpoint of achieving compactness and cost reduction, it is advisable to integrate all the components except the coil L1 and the output capacitor C2 into a semiconductor integrated circuit device and to externally fit the coil L1 and the output capacitor C2 to that semiconductor integrated circuit device.

Now, the operation of the step-up/step-down DC-DC converter configured as described above will be described. The resistors R1 and R2 divide the output voltage $V_{OUT}$ fed out via the output terminal 4, and feed the resulting divided voltage to the error amplifier 5. The error amplifier 5 outputs a voltage $V_A$ commensurate with the difference between the divided voltage of the output voltage $V_{OUT}$ and the output voltage of the reference voltage source 6. The capacitor C1 and the resistor R3 determine the gain and frequency response of the error amplifier 5. The inverting amplifier, which is composed of the resistors R4 and R5, the comparator 7, and the reference voltage source 8, outputs a voltage $V_B$, which is obtained by inverting the voltage $V_A$ outputted from the error amplifier 5 with respect to an inversion reference voltage $V_{REF}$. That is, the level of the inversion reference voltage $V_{REF}$ is the median level between the voltages $V_A$ and $V_B$. The level of the inversion reference voltage $V_{REF}$ can be adjusted by controlling the resistances of the resistors R4 and R5 and the level of the output voltage of the reference voltage source 8.

The comparator COMP1 outputs a control voltage $V_{COMP1}$ that is commensurate with the difference between the output voltage $V_B$ of the inverting amplifier and the triangular wave voltage $V_{TRI}$, having a frequency of 130 kHz and a voltage of 350 $mV_{peak-to-peak}$, outputted from the triangular wave generation circuit 9. The inverter circuit 10 inverts the control voltage $V_{COMP1}$ fed thereto, and outputs the resulting voltage. The nMOS transistor Q1 is turned on and off according to the inverted signal of the control voltage $V_{COMP1}$, and the nMOS transistor Q2 is turned on and off according to the control voltage $V_{COMP1}$.

The comparator COMP2 outputs a control voltage $V_{COMP2}$ that is commensurate with the difference between the output voltage $V_A$ of the error amplifier 5 and the triangular wave voltage $V_{TRI}$ outputted from the triangular wave generation circuit 9. The inverter circuit 11 inverts the control voltage $V_{COMP2}$ fed thereto, and outputs the resulting voltage. The nMOS transistor Q3 is turned on and off according to the inverted signal of the control voltage $V_{COMP2}$, and the nMOS transistor Q4 is turned on and off according to the control voltage $V_{COMP2}$.

Next, a description will be given of a step-up mode, in which the step-up/step-down DC-DC converter operates when the output voltage $V_{OUT}$ is lower than the target voltage. In the step-up mode, the output voltage $V_A$ of the error amplifier 5 is steadily higher than the triangular wave voltage $V_{TRI}$ outputted from the triangular wave generation circuit 9. Accordingly, in the step-up mode, the control voltage $V_{COMP2}$ is steadily low, which keeps the nMOS transistor Q3 steadily on and the nMOS transistor Q4 steadily off.

On the other hand, the output voltage $V_B$ of the inverting amplifier, which is composed of the resistors R4 and R5, the comparator 7, and the reference voltage source 8, crosses the triangular wave voltage $V_{TRI}$ outputted from the triangular wave generation circuit 9. Accordingly, when the voltage $V_B$ is higher than the triangular wave voltage $V_{TRI}$, the control voltage $V_{COMP1}$ is low, and, when the voltage $V_B$ is lower than the triangular wave voltage $V_{TRI}$, the control voltage $V_{COMP1}$ is high. As the level of this control voltage $V_{COMP1}$ shifts, the nMOS transistors Q1 and Q2 are alternately turned on and off.

Figure 2:
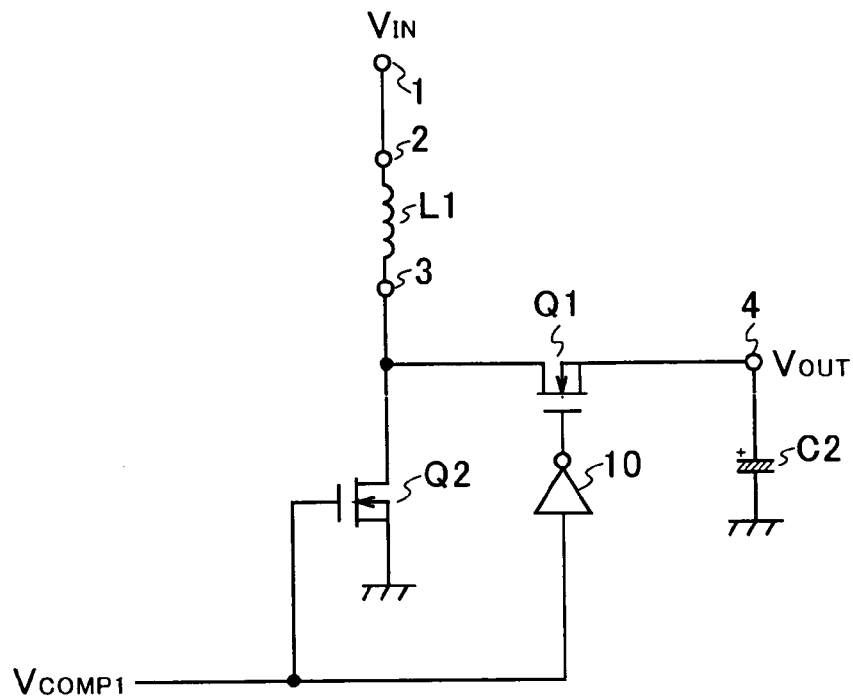
FIG. 2 is a diagram showing an equivalent circuit diagram of the step-up/step-down DC-DC converter shown in FIG. 1 when it is operating in the step-up mode.

Accordingly, the step-up/step-down DC-DC converter shown in FIG. 1, when operating in the step-up mode, has an equivalent circuit as shown in FIG. 2. In FIG. 2, such components as are found also in FIG. 1 are identified with the same reference numbers and symbols. When the nMOS transistor Q1 is off and the nMOS transistor Q2 is on, a current flows from the input terminal 1 to the coil L1, so that magnetic energy is accumulated. By contrast, when the nMOS transistor Q1 is on and the nMOS transistor Q2 is off, a current flows from the input terminal 1 through the coil L1 to the output capacitor C2, so that the magnetic energy accumulated in the coil L1 is released. Through these operations, the input voltage $V_{IN}$ is stepped up to become the output voltage $V_{OUT}$, which is then fed out via the output terminal 4.

Next, a description will be given of a step-down mode, in which the step-up/step-down DC-DC converter operates when the output voltage $V_{OUT}$ is higher than the target voltage. In the step-down mode, the output voltage $V_B$ of the inverting amplifier, which is composed of the resistors R4 and R5, the comparator 7, and the reference voltage source 8, is steadily higher than the triangular wave voltage $V_{TRI}$ outputted from the triangular wave generation circuit 9. Accordingly, in the step-down mode, the control voltage $V_{COMP1}$ is steadily low, which keeps the nMOS transistor Q1 steadily on and the nMOS transistor Q2 steadily off.

On the other hand, the output voltage $V_A$ of the error amplifier 5 crosses the triangular wave voltage $V_{TRI}$ outputted from the triangular wave generation circuit 9. Accordingly, when the voltage $V_A$ is higher than the triangular wave voltage $V_{TRI}$, the control voltage $V_{COMP2}$ is low, and, when the voltage $V_A$ is lower than the triangular wave voltage $V_{TRI}$, the control voltage $V_{COMP2}$ is high. As the level of this control voltage $V_{COMP2}$ shifts, the nMOS transistors Q3 and Q4 are alternately turned on and off.

Figure 3:
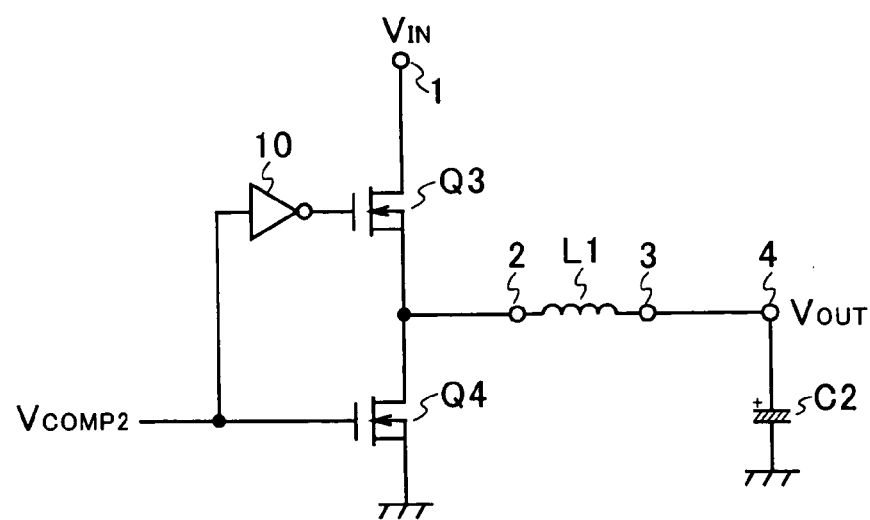
FIG. 3 is a diagram showing an equivalent circuit diagram of the step-up/step-down DC-DC converter shown in FIG. 1 when it is operating in the step-down mode.

Accordingly, the step-up/step-down DC-DC converter shown in FIG. 1, when operating in the step-down mode, has an equivalent circuit as shown in FIG. 3. In FIG. 3, such components as are found also in FIG. 1 are identified with the same reference numbers and symbols. When the nMOS transistor Q3 is on and the nMOS transistor Q4 is off, a current flows from the input terminal 1 through the coil L1 to the output capacitor C2, so that magnetic energy is accumulated. By contrast, when the nMOS transistor Q3 is off and the nMOS transistor Q4 is on, a current flows through the nMOS transistor Q4 and the coil L1 to the output capacitor C2, so that the magnetic energy accumulated in the coil L1 is released. Through these operations, the input voltage $V_{IN}$ is stepped down to become the output voltage $V_{OUT}$, which is then fed out via the output terminal 4.

Next, a description will be given of the operations performed when the step-up and step-down modes are switched from one to the other. Here, the operations performed during switching from the step-up mode to the step-down mode will be described with reference to FIG. 1 and FIGS. 4A to 4E. FIGS. 4A to 4E are diagrams showing the waveforms of the voltages at relevant points in the step-up/step-down DC-DC converter shown in FIG. 1 as observed when it is switched form the step-up mode to the step-down mode. In FIGS. 4A to 4E, such voltages as are shown also in FIG. 1 are identified with the same reference symbols.

By setting the level of the inversion reference voltage $V_{REF}$, which is the median voltage between the voltages $V_A$ and $V_B$, to be higher than the minimum level of the triangular wave voltage $V_{TRI}$ and lower than the maximum level thereof, it is possible to produce a period (hereinafter referred to as the overlap period) during which, in the course of switching from the step-up mode to the step-down mode, both the voltages $V_A$ and $V_B$ cross the triangular wave voltage $V_{TRI}$. Here, since the voltage $V_A$ needs to cross the triangular wave voltage $V_{TRI}$ in the step-up mode and the voltage $V_B$ needs to cross the triangular wave voltage $V_{TRI}$ in the step-down mode, it is preferable that the level of the inversion reference voltage $V_{REF}$ be set to be slightly lower than the maximum level of the triangular wave voltage $V_{TRI}$.

Thanks to the overlap period thus produced, during switching from the step-up mode to the step-down mode, the switching duty of the voltage $V_{OUT1}$ and the switching duty of the voltage $V_{OUT2}$ vary gradually. This permits smooth switching between the step-up and step-down modes. Thus, even when the input voltage $V_{IN}$ fluctuates, it is possible to reduce the ripple superimposed on the output voltage $V_{OUT}$. This makes it possible to always yield a stable output voltage $V_{OUT}$. Thus, the step-up/step-down DC-DC converter shown in FIG. 1 offers increased power conversion efficiency. Incidentally, the output voltage $V_{OUT}$ contains 130 kHz switching noise resulting from the switching operation of the nMOS transistors Q1 to Q4, but this switching noise does not affect in any adverse way the power conversion efficiency of the step-up/step-down DC-DC converter shown in FIG. 1. For the purpose of reducing this switching noise, a filter is provided that is composed of the resistor R3 and the capacitor C1.

Figure 5A:
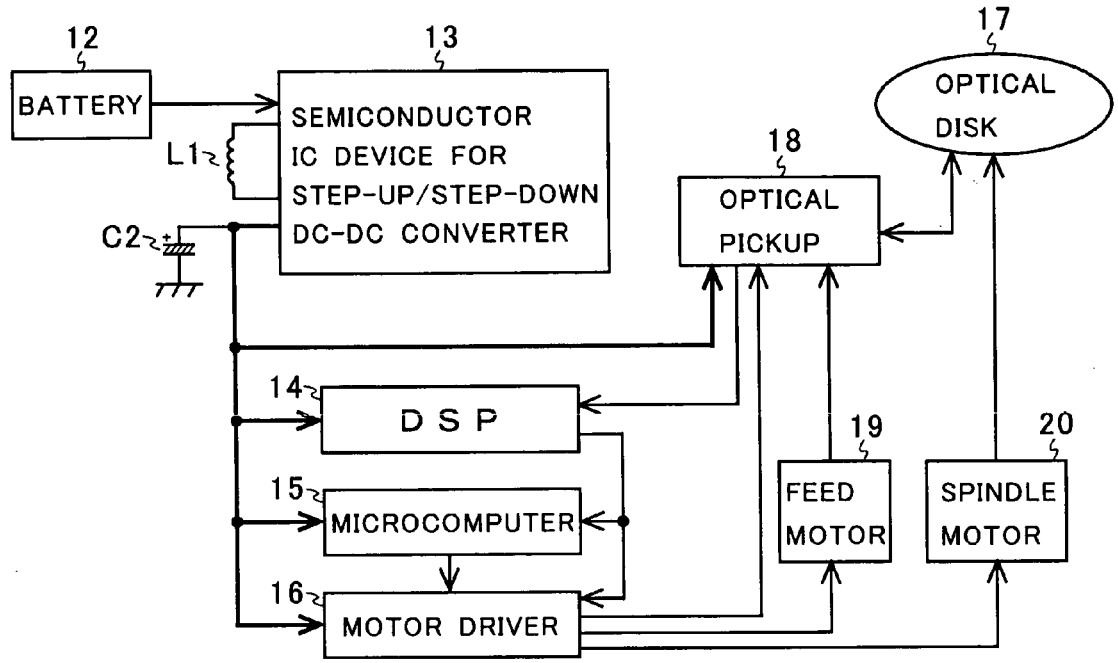
FIG. 5A is a diagram showing an example of the configuration of a portable device according to the invention.

Next, a portable device according to the present invention will be described. Here, an optical disk reproduction apparatus will be taken up and described as an example of a portable device according to the invention. FIG. 5A shows an example of the configuration of an optical disk reproduction apparatus according to the invention.

The optical disk reproduction apparatus shown in FIG. 5A is composed of a semiconductor integrated circuit device 13 for a step-up/step-down DC-DC converter, a coil L1, an output capacitor C2, a DSP 14, a microcomputer 15, a motor driver 16, an optical pickup 18, a feed motor 19, and a spindle motor 20. The optical disk reproduction apparatus shown in FIG. 5A is fitted with a battery 12 and an optical disk 17.

The battery 12 feeds a voltage to the input terminal (not illustrated) of the semiconductor integrated circuit device 13 for a step-up/step-down DC-DC converter. The semiconductor integrated circuit device 13 for a step-up/step-down DC-DC converter is a semiconductor integrated circuit device having the same circuit configuration as the step-up/step-down DC-DC converter shown in FIG. 1 except that the coil L1 and the output capacitor C2 are excluded therefrom. The semiconductor integrated circuit device 13 for a step-up/step-down DC-DC converter is externally fitted with the coil L1 and the output capacitor C2.

The output voltage of the step-up/step-down DC-DC converter, which is composed of the coil L1, the output capacitor C2, and the semiconductor integrated circuit device 13 for a step-up/step-down DC-DC converter, is fed to a laser generating device incorporated in the optical pickup 18, to the DSP 14, to the microcomputer 15, and to the motor driver 16.

The spindle motor 20 drives the optical disk 17 to rotate, and the rotating optical disk 17 is irradiated with a laser beam radiated from the optical pickup 18. The optical pickup 18 condenses the laser beam onto the optical disk 17 through an objective lens (not illustrated). The optical pickup 18 detects the reflected light from the optical disk 17, converts the detected optical signal into an electrical signal, and then feeds the obtained electrical signal to the DSP 14.

The DSP 14 processes the digital electrical signal outputted from the optical pickup 18 to reproduce it, and feeds part of the reproduced data to the microcomputer 15. On the basis of control signals from the DSP 14 and the microcomputer 15, the motor driver 16 feeds electric power to the feed motor 19, which moves the optical pickup 18, to the spindle motor 20, and to the motor (not illustrated) that drives the objective lens of the optical pickup 18.

In the optical disk reproduction apparatus shown in FIG. 5A, the step-up/step-down DC-DC converter composed of the coil L1, the output capacitor C2, and the semiconductor integrated circuit device 13 for a step-up/step-down DC-DC converter offers high power conversion efficiency, which helps prolong the life of the battery 12, and thus permits the apparatus to be used for an extended period. Moreover, since the step-up/step-down DC-DC converter can be realized with a small number of components, the set as a whole can be made compact.

Figure 5B:
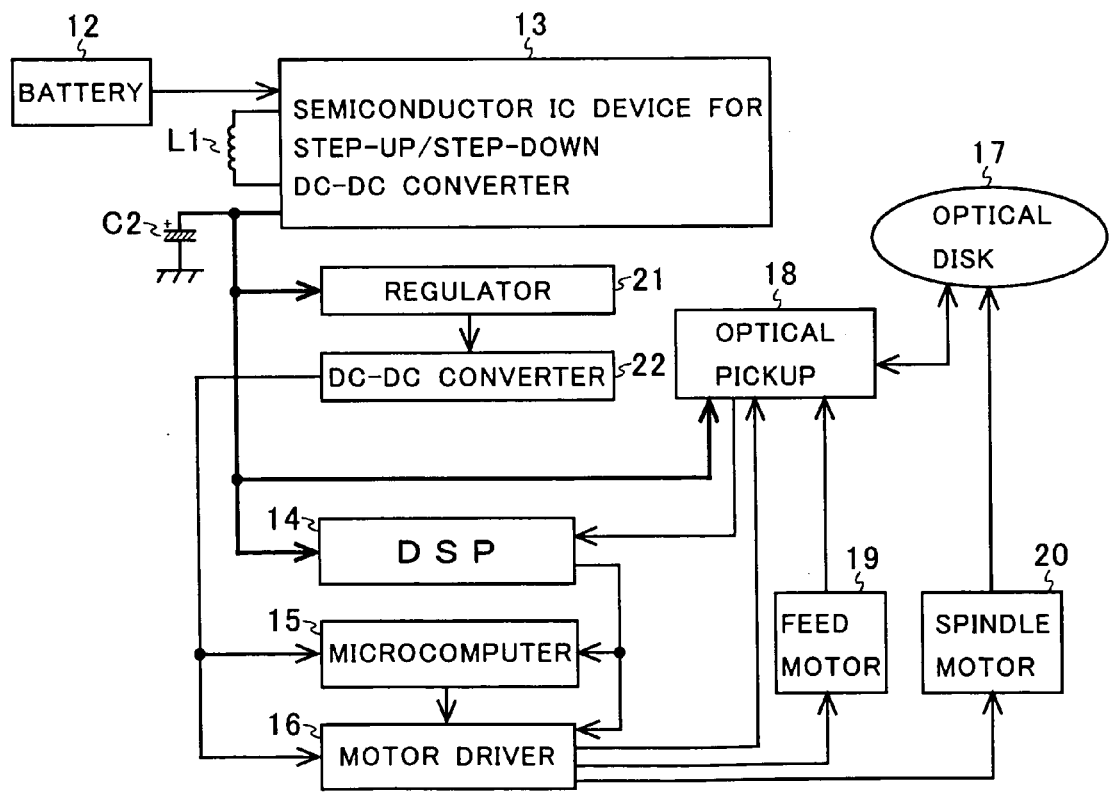
FIG. 5B is a diagram showing an example of the configuration of a portable device according to the invention.
Figure 6:
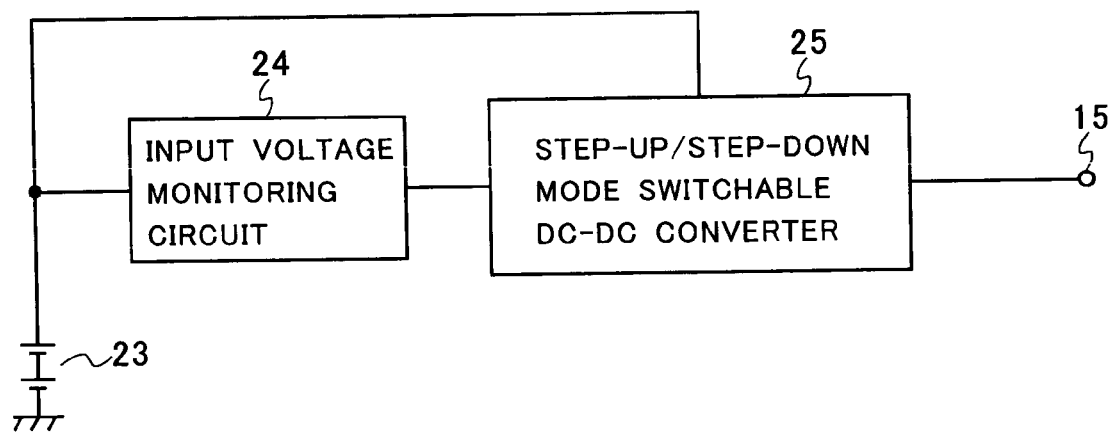
FIG. 6 is a diagram showing an example of the configuration of a conventional step-up/step-down DC-DC converter.

FIG. 5B shows another example of the configuration of an optical disk reproduction apparatus according to the invention. In FIG. 5B, such components as are found also in FIG. 5A are identified with the same reference numbers and symbols, and their detailed explanation will not be repeated. As compared with the optical disk reproduction apparatus shown in FIG. 5A, the optical disk reproduction apparatus shown in FIG. 5B is additionally provided with a regulator 21 and a DC-DC converter 22. The output voltage of the step-up/step-down DC-DC converter, which is composed of the coil L1, the output capacitor C2, and the semiconductor integrated circuit device 13 for a step-up/step-down DC-DC converter, is fed to the regulator 21, to a laser generating device incorporated in the optical pickup 18, and to the DSP 14. The output voltage of the regulator 21 is converted by the DC-DC converter 22, and is then fed to the microcomputer 15 and to the motor driver 16.

In the optical disk reproduction apparatus shown in FIG. 5B, as in the optical disk reproduction apparatus shown in FIG. 5A, the life of the battery 12 is prolonged, which permits the apparatus to be used for an extended period without replacement of the battery. Moreover, in the optical disk reproduction apparatus shown in FIG. 5B, the output of the step-up/step-down DC-DC converter composed of the coil L1, the output capacitor C2, and the semiconductor integrated circuit device 13 for a step-up/step-down DC-DC converter is not directly connected to the motor driver 16, which is a circuit that requires a large drive current and that makes the voltage supplied thereto fluctuate, but is connected to the motor driver 16 through the regulator 21 and the DC-DC converter 22. This makes the load current of the step-up/step-down DC-DC converter more stable than in the optical disk reproduction apparatus shown in FIG. 5A. This helps make the output voltage of the step-up/step-down DC-DC converter more stable.

What is claimed is:

1. A step-up/step-down DC-DC converter that yields an output voltage by stepping up or down an input voltage, comprising:

an error signal generation circuit that generates an error signal commensurate with a difference between a voltage commensurate with the output voltage and a predetermined reference voltage;

an inverting circuit that generates an inverted signal by inverting the error signal with respect to a predetermined inversion reference voltage;

a triangular wave generation circuit that generates a triangular wave signal whose maximum level is higher than the predetermined inversion reference voltage and whose minimum level is lower than the predetermined inversion reference voltage;

a first comparator that compares the error signal with the triangular wave signal;

a second comparator that compares the inverted signal with the triangular wave signal;

a step-up switching circuit that is turned on and off according to an output of the first comparator;

a step-down switching circuit that is turned on and off according to an output of the second comparator;

an inductor to and from which energy is accumulated and released as the step-up switching circuit and/or the step-down switching circuit is turned on and off; and a smoothing circuit that smoothes the output voltage by receiving the energy released from the inductor.

2. A step-up/step-down DC-DC converter as claimed in claim 1, wherein a filter circuit for reducing noise that accompanies the triangular wave signal is provided between input and output sides of the error signal generation circuit.

3. A semiconductor integrated circuit device for a step-up/step-down DC-DC converter, comprising:

an output terminal;

an error signal generation circuit that generates an error signal commensurate with a difference between a voltage commensurate with a voltage at the output terminal and a predetermined reference voltage;

an inverting circuit that generates an inverted signal by inverting the error signal with respect to a predetermined inversion reference voltage;

a triangular wave generation circuit that generates a triangular wave signal whose maximum level is higher than the predetermined inversion reference voltage and whose minimum level is lower than the predetermined inversion reference voltage;

a first comparator that compares the error signal with the triangular wave signal;

a second comparator that compares the inverted signal with the triangular wave signal;

a step-up switching circuit that is turned on and off according to an output of the first comparator; and a step-down switching circuit that is turned on and off according to an output of the second comparator.

4. A semiconductor integrated circuit device for a step-up/step-down DC-DC converter as claimed in claim 3, wherein a filter circuit for reducing noise that accompanies the triangular wave signal is provided between input and output sides of the error signal generation circuit.

5. A portable device comprising:

a step-up/step-down DC-DC converter that yields an output voltage by stepping up or down an input voltage, wherein the step-up/step-down DC-DC converter comprises:

an error signal generation circuit that generates an error signal commensurate with a difference between a voltage commensurate with the output voltage and a predetermined reference voltage;

an inverting circuit that generates an inverted signal by inverting the error signal with respect to a predetermined inversion reference voltage;

a triangular wave generation circuit that generates a triangular wave signal whose maximum level is higher than the predetermined inversion reference voltage and whose minimum level is lower than the predetermined inversion reference voltage;

a first comparator that compares the error signal with the triangular wave signal;

a second comparator that compares the inverted signal with the triangular wave signal;

a step-up switching circuit that is turned on and off according to an output of the first comparator;

a step-down switching circuit that is turned on and off according to an output of the second comparator;

an inductor to and from which energy is accumulated and released as the step-up switching circuit and/or the step-down switching circuit is turned on and off; and a smoothing circuit that smoothes the output voltage by receiving the energy released from the inductor.

6. A portable device as claimed in claim 5, further comprising a regulator, a DC-DC converter, and a circuit whose driving requires a large current and makes a voltage supplied thereto fluctuate greatly, wherein the output voltage of the step-up/step-down DC-DC converter is fed through the regulator and the DC-DC converter to the circuit whose driving requires a large current and makes the voltage supplied thereto fluctuate greatly.

7. A portable device as claimed in claim 5, wherein a filter circuit for reducing noise that accompanies the triangular wave signal is provided between input and output sides of the error signal generation circuit.

8. A portable device as claimed in claim 6, wherein a filter circuit for reducing noise that accompanies the triangular wave signal is provided between input and output sides of the error signal generation circuit.

* * * * *